Patented May 2, 1939

2,156,928

UNITED STATES PATENT OFFICE 2,156,928

PROCESS FOR THE PRODUCTION OF ZEIN

Lloyd C. Swallen, Pekin, Ill., assignor, by mesne assignments, to Corn Products Refining Company, New York, N. Y., a corporation of New Jersey No Drawing. Application May 8, 1935, Serial No. 20,404. Renewed January 6, 1938

7 Claims. (Cl. 260—123)

My invention relates to an improved process for obtaining zein in dry solid form from solutions in organic solvent mixtures. More specifically, my invention relates to a process for obtaining zein from alcoholic solutions thereof in a form suitable for use in the production of protein plastics.

It has long been known that relatively pure zein could be obtained in solution in alcohol or other solvent mixtures by extraction from maize proteins such as gluten meal. Various processes have also been suggested for obtaining the zein in a dry solid form from such solutions. However, these processes have been devised primarily for laboratory preparations and have many disadvantages from the standpoint of commercial operation. For example, in direct evaporation of the solvents the tendency for the material to fuse into a homogeneous mass is often encountered. The removal of remaining solids from such fused masses can then be accomplished only with great difficulty. It has also been proposed to precipitate the zein from dilute solutions by the use of immiscible liquids such as ether or the like, thus obtaining a fine granular precipitate. Such processes involve considerable solvent losses and it has been found to be extremely difficult to handle the fine precipitates. The zein in this form is too finely divided to be handled on a screen and it is extremely difficult to filter. Other suggested processes which serve for laboratory preparations are likewise impractical from a commercial standpoint.

I have now discovered a process which obviates all of the prior difficulties and has the further advantage of being applicable to extremely concentrated solutions of zein. My process comprises, briefly, mixing water with the alcoholic zein solution to precipitate the zein in a doughy mass, mixing the doughy mass with water until the surfaces lose substantially all tendency toward mutual adhesion, but the body of the mass remains cohesive, rolling the mass into thin sheets, soaking the sheets in water to remove remaining solvents, and finally drying the sheets at low temperatures. It may be seen that this process involves minimum solvent losses and is advantageous from the standpoint of mechanical handling. This process is applicable to all zein solutions in organic solvent mixtures, but is particularly adapted to the recovery of zein from concentrated alcoholic solutions such as those obtained in the process of my copending application Ser. No. 20,402, filed May 8, 1935.

The preliminary step of my process may be carried out simply by mixing water into the zein solution. In the case of dilute zein solutions a granulated precipitate may be encountered under certain conditions especially if the solution is added slowly to water. However, such conditions are difficult to control and the doughy precipitate which is suitable for my process will usually be obtained even if the solution is added to the water instead of vice versa. In any event, a suitable precipitate may be secured by slowly stirring water into the solution. The amount of water employed is not critical, but should, of course, be sufficient to secure complete separation.

The mixing operation may be carried out directly after precipitation has been secured, or, if preferred, the original aqueous solvent layer may be decanted and fresh water added for the mixing operation. In order to secure a suitable consistency for rolling, it may be found to be necessary to use fresh water at this stage unless a considerable excess of water was used in the preliminary precipitation. The mixing of the doughy precipitate with water may be effected in any suitable manner, as for example, in a dough mixer of the usual type. The mixing should be continued until the mass has attained a consistency such that there is little tendency to adhere to the rolls during the next step of the process and no tendency for the rolled sheets to mutually adhere during subsequent soaking. At the end of the mixing operation the mass may suitably have the consistency of a stiff dough which may be cut with a wet knife. It is often desirable to continue the mixing until the surfaces of the mass lose substantially all tendency toward mutual adhesion but the body of the mass remains cohesive. A preliminary experiment will determine the optimum point at which the mixing should be stopped, but in most cases the correct point may be determined merely by observing the form of the mixing mass. When the mass begins to lose its cohesive nature it will be seen to "break up" in the mixer, usually in the form of separate lumps or shreds. The mixing should be stopped as soon as this tendency is observed, and preferably somewhat before this stage is reached. After decanting the aqueous layer, the material should preferably be passed directly to the rolls.

The rolling operation is carried out in any suitable type of rolling mill having rolls operated at equal speeds. If the consistency of the mass has been carefully regulated in the mixing operation, the material will be found to sheet out very readily, and sheets of $\frac{1}{16}$ to $\frac{1}{32}$ inch thickness may be obtained by a single pass through the rolls. These sheets are preferably immersed immediately in cool water for the soaking operation. At this stage of the process the sheet will still exhibit some tendency toward adhesion if water is not present or if subjected to any pressure.

The soaking is preferably effected in water of a temperature not substantially above 25° C. The amount of water employed is not critical as long as sufficient is used for complete extraction of residual solvents. About 1 gallon of water per pound of zein will usually be found to be satisfactory. The time of soaking will depend to some extent upon the amount of residual solvents and upon the degree to which it is desired to remove such materials. Soaking for a period of 12 hours will usually be sufficient to remove residual solvents to an extent sufficient to permit satisfactory drying.

After soaking, the sheets are removed from the liquid and drained on screens or other suitable apparatus. The sheets may be dried at atmospheric temperature, in which case about two days may be required in still air. The drying process will be accelerated by utilizing a current of air and by increasing the temperature as the drying proceeds. The final stages of the drying may be effected at temperatures up to 40° C., but I prefer to carry out the preliminary drying at atmospheric temperature to avoid any possible fusing of the mass. After the sheets are completely dry they will be found to be in suitable condition for grinding to the desired degree of fineness for plastic purposes or other uses.

My invention may further be illustrated by the following specific examples:

Example I

A zein solution obtained by extracting gluten meal with aqueous alcohol and subsequently extracting oil and coloring matter with toluol was found to have the following approximate composition:

| | Per cent by weight |
|---|---|
| Zein | 10 |
| Ethyl alcohol | 57 |
| Water | 24 |
| Toluol | 9 |

100 gallons of this solution was placed in a vessel equipped with a suitable agitator and 200 gallons of water was slowly added during agitation. The zein was immediately precipitated in a doughy mass which, after thorough mixing, exhibited a tendency to break up into shreds. Agitation was then stopped and the liquid drained off. The doughy mass was transferred to a rubber mill having the rolls set at uniform speed. A single pass through the rolls gave sheets approximately $\tfrac{1}{32}$nd inch thick which were immediately transferred to a soaking vat containing water at 20° C. The sheets were allowed to remain over night, after which they were transferred to a screen and drained. The sheets were then spread on screen drying racks to a thickness corresponding to about 6 sq. ft. of surface per pound of dry zein, and were allowed to dry for two days in moderately still air at a temperature of 20–25° C. The dried sheets were ground to 20 mesh size without encountering any difficulty from the standpoint of fusing or adhesion. The material was found to give satisfactory clear products when utilized in the production of plastics.

Example II

A thick zein paste produced according to the process of my copending application Ser. No. 20,402, filed May 8, 1935, was found to have the following composition:

| | Per cent by weight |
|---|---|
| Zein | 35 |
| Alcohol | 50 |
| Water | 5 |
| Toluol | 10 |

200 lbs. of this paste was placed in a dough mixer and 25 gallons of water was slowly added during agitation. A doughy precipitate was immediately secured and after thorough mixture had been secured the liquid was drained off and 25 gallons of fresh water was added. The mixing was then continued until the doughy mass exhibited a tendency to become stringy, at which time the agitation was stopped and the liquid drained off. The resulting mass was then treated as in Example I above.

It will be understood that the above examples are illustrative only and are not to be construed as limiting the scope of my invention. My process is applicable to solutions of zein and other solvents such as aqueous methyl alcohol or mixed solvents containing alcohol and other organic solvents. Likewise, my process is applicable to practically any concentration of zein solution, although it is particularly adapted to the treatment of heavy pastes. Various modifications of procedure will, of course, occur to those skilled in the art. For example, instead of rolling the doughy precipitate into sheets, the material could be extruded directly into water with a suitable extrusion apparatus. Suitable equivalent types of apparatus for other steps in the process will also be apparent. In general, it may be said that any equivalents or any modifications of procedure which would naturally occur to one skilled in the art may be employed without departing from the scope of my invention.

My invention now having been described, what I claim is:

1. Process for obtaining zein in a dry solid state from a solution of zein in a water soluble organic solvent that can be removed from zein by washing which comprises mixing water with the solution and thereby diluting the solvent in said solution and agitating the mixture until the zein precipitates and assumes a non-sticky doughy consistency, separating this doughy mass from the supernatant liquid, forming said mass into bodies of suitable thickness for water penetration, soaking said bodies in water whereby the residual solvents are removed, separating the resulting aqueous solution of residual solvents and finally drying said bodies at temperatures low enough to prevent fusing the zein during drying.

2. Process for obtaining zein in a dry solid state from a solution of zein in a water soluble organic solvent that can be removed from the zein by washing which comprises mixing water with the solution and thereby diluting the solvent in said solution and agitating the mixture until the zein phase assumes a doughy consistency, separating this doughy mass from the supernatant liquid, mixing more water with said mass until the mass assumes the consistency of a stiffer non-sticky dough, separating said last-mentioned doughy mass from the supernatant liquid, forming said mass into bodies of suitable thickness for water penetration, soaking said bodies in water whereby residual solvents are removed, separating the resulting aqueous solution of residual solvents and finally drying said bodies at temperatures low enough to prevent fusing of the zein during drying.

3. Process for obtaining zein in a dry solid state from an aqueous alcohol solution of zein which comprises mixing water with the solution and thereby diluting the solvent in said solution and agitating the mixture until the zein precipitates and assumes a non-sticky doughy consistency, separating the doughy mass from the supernatant liquid, forming said mass into bodies of a thickness ranging from $\frac{1}{8}$ inch to $\frac{1}{64}$ inch, soaking said bodies in water whereby residual solvents are removed, separating the resulting aqueous solution of residual solvents, and finally drying said bodies at temperatures low enough to prevent fusing of the zein during drying.

4. Process for obtaining zein in a dry solid state from a solution of zein in aqueous alcohol which comprises mixing water with the solution and thereby diluting the solvent in said solution and agitating the mixture until the zein precipitates and assumes a doughy consistency, separating this doughy mass from the supernatant liquid, forming said mass into bodies of thickness ranging from $\frac{1}{8}$ inch to $\frac{1}{64}$ inch, soaking said bodies in water whereby residual solvents are removed, separating the resulting aqueous solution of residual solvents, and finally drying said bodies at temperatures low enough to prevent fusing of the zein during drying.

5. Process for obtaining zein in a dry solid state from a solution of zein in aqueous alcohol which comprises mixing water with the solution and thereby diluting the solvent in said solution and agitating the mixture until the zein precipitates and assumes a doughy consistency, separating this doughy mass from the supernatant liquid, forming said mass into bodies of suitable thickness for water penetration, soaking said bodies in water whereby residual solvents are removed, separating the resulting aqueous solution of residual solvents, and finally drying said bodies at temperatures low enough to prevent fusing of the zein during drying.

6. Process for obtaining zein in a dry solid state from a solution of zein in a water soluble organic solvent that can be removed from the zein by washing which comprises mixing water with the solution and thereby diluting the solvent in said solution and agitating the mixture until the zein precipitates and assumes a non-sticky doughy consistency, separating this doughy mass from the supernatant liquid, forming said mass into bodies of suitable thickness for water penetration, soaking said bodies in water whereby residual solvents are removed, separating the resulting aqueous solution of residual solvents, and drying said bodies at an initial temperature not substantially above 25° C. and a final temperature not substantially above 40° C.

7. Process for obtaining zein in a dry solid state from a solution of zein of substantially 10% concentration or greater in a water soluble organic solvent which comprises: precipitating the zein from its solution by introducing the solution into water and forming the precipitated zein into bodies of suitable thinness for water penetration; soaking said bodies in water until the residual solvent is substantially completely removed; separating the zein from the water and solvent; and drying the zein at temperatures low enough to prevent fusing.

LLOYD C. SWALLEN.